United States Patent
Davidson et al.

(10) Patent No.: US 6,577,862 B1
(45) Date of Patent: Jun. 10, 2003

(54) SYSTEM AND METHOD FOR PROVIDING COMFORT NOISE IN A MOBILE COMMUNICATION NETWORK

(75) Inventors: Lee Davidson, McKinney, TX (US); Eric Valentine, Plano, TX (US); Heino Hameleers, Kerdrade (NL); Frank Hundscheidt, Kerkrade (NL)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/471,880

(22) Filed: Dec. 23, 1999

(51) Int. Cl.[7] .................................................. H04Q 7/00
(52) U.S. Cl. ........................ 455/422; 455/63; 370/433; 370/528
(58) Field of Search ................................ 455/422, 450, 455/62, 63, 517, 524; 370/433, 442, 528

(56) References Cited

U.S. PATENT DOCUMENTS

| 5,299,198 A | 3/1994 | Kay et al. | |
| 5,537,509 A | 7/1996 | Swaminathan et al. | |
| 5,612,955 A | * 3/1997 | Fernandes et al. | 455/63 |
| 5,754,537 A | 5/1998 | Jamal | |
| 5,812,936 A | * 9/1998 | DeMont | 455/83 |

FOREIGN PATENT DOCUMENTS

| WO | 96/28809 | 9/1996 |
| WO | 00/56094 | 9/2000 |

\* cited by examiner

*Primary Examiner*—Thanh Cong Le

(57) ABSTRACT

Provided is a system, method, and computer program for transmitting, across a mobile communication network, the occurrence of silence in a communication channel. The system generally comprises a first Media Gateway (MGW), which could be a transmission control node (first TCN), for executing a silence transmission algorithm, and a second MGW, such as a second transmission control node (second TCN), for executing a comfort noise generating algorithm. One method detects silence in a communications channel and then transmits a network silence indicator (SID). Another method receives the network SID and then produces a comfort noise. The computer program utilizes a query module for detecting a comfort noise production module in a destination MGW, and a network SID transmission module to send a network SID across a PLMN.

9 Claims, 2 Drawing Sheets

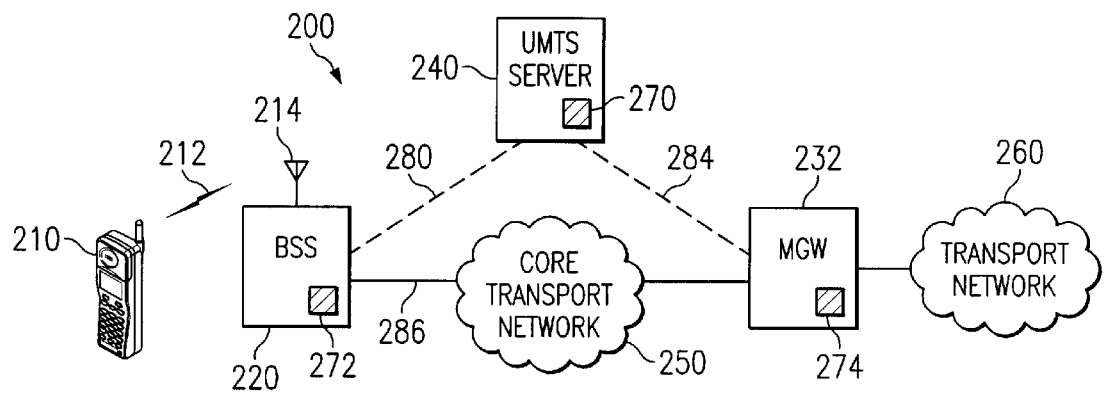
FIG. 2
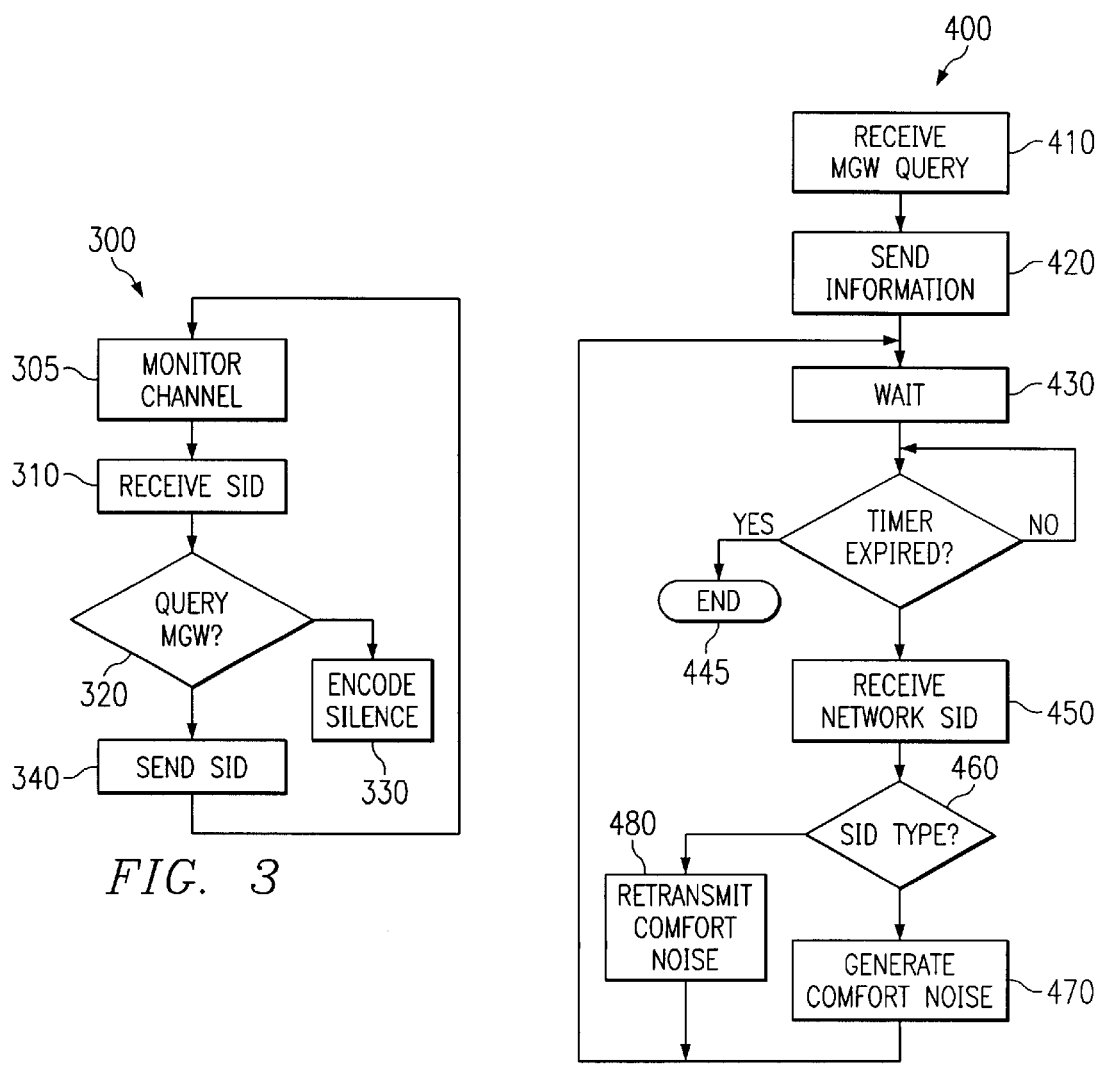
FIG. 3
FIG. 4

SYSTEM AND METHOD FOR PROVIDING COMFORT NOISE IN A MOBILE COMMUNICATION NETWORK

TECHNICAL FIELD

The present invention relates generally to telecommunications, and more specifically, to transmitting comfort noise across a mobile communications network, such as a third generation mobile system.

BACKGROUND OF THE INVENTION

System Background

As terminal devices (also called mobile communication devices), such as mobile phones, Personal Digital Assistants (PDAs), and Mobile Computing Devices (PCDs), for example, continue to proliferate, mobile communications network providers are seeking to provide economical networks and radio protocols to deliver seamless service across multiple networks. Third generation mobile systems (3G systems), such as the Universal Mobile Telecommunications Systems (UMTS, now known as INT-2000), Mobile Broadband Systems (MBS), Wireless Local Area Networks (WLAN), and Global System for Mobile Communications (GSM) derivatives, for example, address the increasing demand for mobile communication services.

FIG. 1 (Prior Art) illustrates a generic 3G system of a GSM-type mobile communications network that incorporates both a mobile phone air interface and a satellite-phone air interface. Though the 3G system of FIG. 1 is illustrated as a GSM system, it should be understood that the 3G system architecture illustrated in FIG. 1 generally applies to any 3G system. In addition, though much of the following discussion is directed at unidirectional information flow (from a mobile phone to another terminal device), it should be understood that the flow of information may also take place in the opposite direction from that discussed.

Accordingly, a mobile phone 110, which could be any terminal device, is shown in communication with an antenna 114 across an air interface. Communications take place across the mobile phone air interface in a first channel 112 (and an optional second channel 116) which carries information, such as sound or data, between the mobile phone 110 and the antenna 114 as a data unit contained in a time slot 118. Then communications traveling through the antenna 114 pass to a Base Station (BS) 120 (which is also known as a Base Transceiver Subsystem, or BTS).

Similarly, a satellite-phone 170 uses a first channel 172a to transmit and receive information in a timeslot 178a, across the satellite-phone air interface, to or from a satellite 174. An optional second channel 176a is shown to illustrate that availability of multi-channel communications. The satellite 174 is one of a network of satellites that orbit the Earth, typically in a geosynchronous orbit. The satellite 174 provides for communication, perhaps by communicating with a second satellite (not shown), with the base station 122 via a first channel 172b and/or second channel 176b, and transfers information in a timeslot 178b. Although FIG. 1 illustrates communication occurring across the air interfaces in a single timeslot and in a single channel, it should be understood that communication in a 3G system may use multiple timeslots in a single channel, single timeslots in multiple channels, or multiple timeslots in a plurality of channels.

Traditionally, in a mobile communications network, the transfer of control commands (the pathway of which is called a control plane), and the transfer of user voice or data (the pathway of which is called a user plane), have occurred through the same transmission path and devices. However, one distinguishing characteristic of some implementations of third generation mobile communication systems is the physical separation of the control plane from the user plane. Accordingly, the connections which comprise the control plane are shown as dotted lines, such as a dotted line 180, which connects base station 120 with a control node 140 through a Radio Network Controller (RNC) 132. Likewise, the connections that comprise the user plane are shown as solid lines, such as a solid line 186, which connects the base station 120 with a media gateway 130 which in 3G will be a Transmission Control Node (TCN) 130.

Accordingly, the devices and connections existing on the land-based portion of the mobile communications network (called the Public Land Mobile Network, or PLMN) which transfer voice, data, or video information (collectively, "information") between terminal devices define a user plane. Though the following discussion is directed at unidirectional information flow (from the mobile phone 110 to another terminal device), it should be understood that the flow of information also takes place in the opposite direction from that discussed. Thus, the user plane of FIG. 1 is defined by the route information travels from the antenna 114, through the BS 120, and on to the media gateway 130. The user plane continues from the media gateway 130 to a core transport network 150 that passes information onto a media gateway associated with the other terminal device. For example, if the other terminal device were the satellite-phone 170, the media gateway base station controller combination MGW/BSC 138, and the second base station 122 would further define the user plane. A control plane is similarly defined by the devices that execute the control commands in a PLMN, and the pathway the control commands travel from device to device in the PLMN.

To control the transfer of information through the third generation mobile system, the control node (CN) 140 [which is associated with a Mobile Switching Center (MSC) in a second generation system, or, as shown here, is a UMSC (UMTS Mobile Switching Center) server in 3G GSM] communicates with the base stations 120, 122, as well as the media gateways 130, 132, 134, 136 and MGW/BSC 138. Thus, the UMTS server 140 directs control commands traditionally associated with a control channel signal in second generation and first generation mobile communications systems. By separating the control plane and the user plane, user data can be transferred more efficiently between media gateways, and the control plane can be separately configured for Quality of Service and security. Thus, 3G systems employing this architecture increase flexibility and transmission efficiency in the transport network.

Though the third generation mobile system of FIG. 1 is illustrated as a 3G Global System for Mobile Communication (GSM), it should be understood that the 3G system architecture illustrated in FIG. 1 generally applies to any third generation mobile system. Thus, while the media gateway 130 will be a Base Station Control (BSC) in second generation GSM, it will be a Radio Network Controller (RNC) or Transmission Control Node (TCN) in UMTS.

Channel Communications and Transport Network Communications

In GSM, sound communications (or hereinafter, "voice communications") pass across an air interface in at least one channel, in a discreet time unit known as a frame. Each frame is subdivided into a number of smaller discrete time units, known as timeslots. For example, in GSM, a single frame is subdivided into eight timeslots. Each timeslot is further divided in time into bit slots, and the bit slots are organized so that the time slot can accommodate two words of 57 bits each, as well as other bits that are needed for the transmission of the words. Similar methods of time division as well as frequency division are used across the air interfaces associated with other mobile communications networks.

In operation, to provide for predictable communication, each mobile phone call is assigned at least one time slot in a frame. However, to improve communication quality or throughput, multiple timeslots (in a single frame) in a single channel, a single timeslot in multiple channels, or multiple timeslots in a plurality of channels may be allocated to a communication.

A collection of bits representing voice communication, whether organized as a word or other assemblage, is referred to as a voice data unit. Typically, when transferring voice communications, voice samples (or data units) arriving from a mobile phone are interleaved and extracted in the base station 120 until a predetermined number have accumulated. Once the predetermined number of voice data units have extracted, the BS passes the data units to the originating TCN 130, which assembles the voice data units into whatever format is needed by the core network 150. Typical core networks include Internet Protocol (IP) networks, and Asynchronous Transfer Mode (ATM) networks, for example.

Accordingly, a voice data unit is (or voice data units are) transferred across a mobile communications network in ATM cells or IP packets (the ATM cell or IP packet contains the voice data units, which are referred to as the "payload" of the IP packet or the ATM cell). More specifically, the core transport network 150 accepts the data units from the TCN 130 and provides routing to a destination media gateway (MGW), such as the second MGW 132, which is in communication with a public switched network (PSTN) 162. Of course, the voice data units could pass to other destination media gateways, which could be TCNs, such as a third MGW 134, which is in communication with an ATM network 164, a fourth MGW 136 which is in communication with an IP based network 166, or the fifth MGW/BSC 138, which is in communication with the second base station 122.

Parties to a communication, such as a conversation, produce sound (i.e., talk) about 40% to 60% of the time they are actually occupying the communication channel. In other words, the audible sounds produced by the parties to a conversation are typically about 40% to 60% silence. However, if "true silence," meaning no noise at all, is transmitted across the network, the parties often misinterpret the absence of noise as an indication of a problem with the communication. Thus, to provide the parties to the conversation assurance that the communication is working, some level of "comfort noise" (or silent noise) is sent across the network when the parties are not speaking.

Accordingly, to provide for comfort noise, the BS receives the "silence" information from a terminal device and uses these samples of silence to take the place of what would otherwise be speech samples. These samples are converted into voice data items, and are then placed in the payload portion of IP packets or ATM cells and are sent across the mobile communications network. Unfortunately, because it can take as much payload to transfer silence as it does to transfer actual voice communication, there is a high price to pay for the transport of this "silence"— a tremendous amount of processing (approximately 40%, and as much as 60%, of a mobile communications network processing effort) is spent transferring silence (or comfort noise).

Therefore, there exists the need for a system, method and computer program for transmitting, across a mobile communication network, comfort noise and that reduces the processing requirements of the prior art.

SUMMARY OF THE INVENTION

The present invention achieves technical advantages as a system, computer program, and method for transmitting, across a mobile communication network, the occurrence of silence in a communication channel. When silence is detected on an upstream communication channel at a BS, either directly or as a silence identifier (SID), a network SID is generated to indicate silence on the communications channel. The network SID is received by a destination TCN, which then generates comfort noise in a destination terminal device. By using the network SID, the present invention reduces the processing demands needed to provide for silent noise detection and comfort noise generation.

In one embodiment, the present invention is a system for transmitting, across a mobile communication network, the occurrence of silence in a communication channel. The system generally comprises a control node, a first transmission control node (first TCN) for executing a silence transmission algorithm, and a second transmission control node (second TCN) for executing a comfort noise generating algorithm. The first TCN and the second TCN are in communication with the control node in a control plane. A core transport network couples the first TCN to the second TCN in a user plane.

In another embodiment, the present invention is a method for transmitting, across a mobile communication network, the occurrence of silence in a communication channel. The method comprises the steps of detecting silence in a communications channel, and transmitting a network SID. Then, either as a continuation of the present method, or as an independent method, a network silence indicator (SID) is received, and comfort noise is produced.

In yet another embodiment, the present invention is a computer program. The computer program comprises a query module for detecting a comfort noise production module in a destination TCN, and a network SID transfer module for placing a network SID on the mobile communications network.

BRIEF DESCRIPTION OF THE DRAWINGS

Various aspects of the invention, including alternative embodiments, are understood by reference to the following Detailed Description of a Preferred Embodiment, which can be better understood by reference to the drawings, in which:

FIG. 2 is a simplified diagram of one embodiment of the present invention implemented in a 3G-NA system;

FIG. 3 illustrates one embodiment of a network SID algorithm according to the teachings of the present invention; and FIG. 4 is a block flow diagram of a comfort noise algorithm.

DETAILED DESCRIPTION OF A PREFERRED EMBODIMENT

Figure 1:
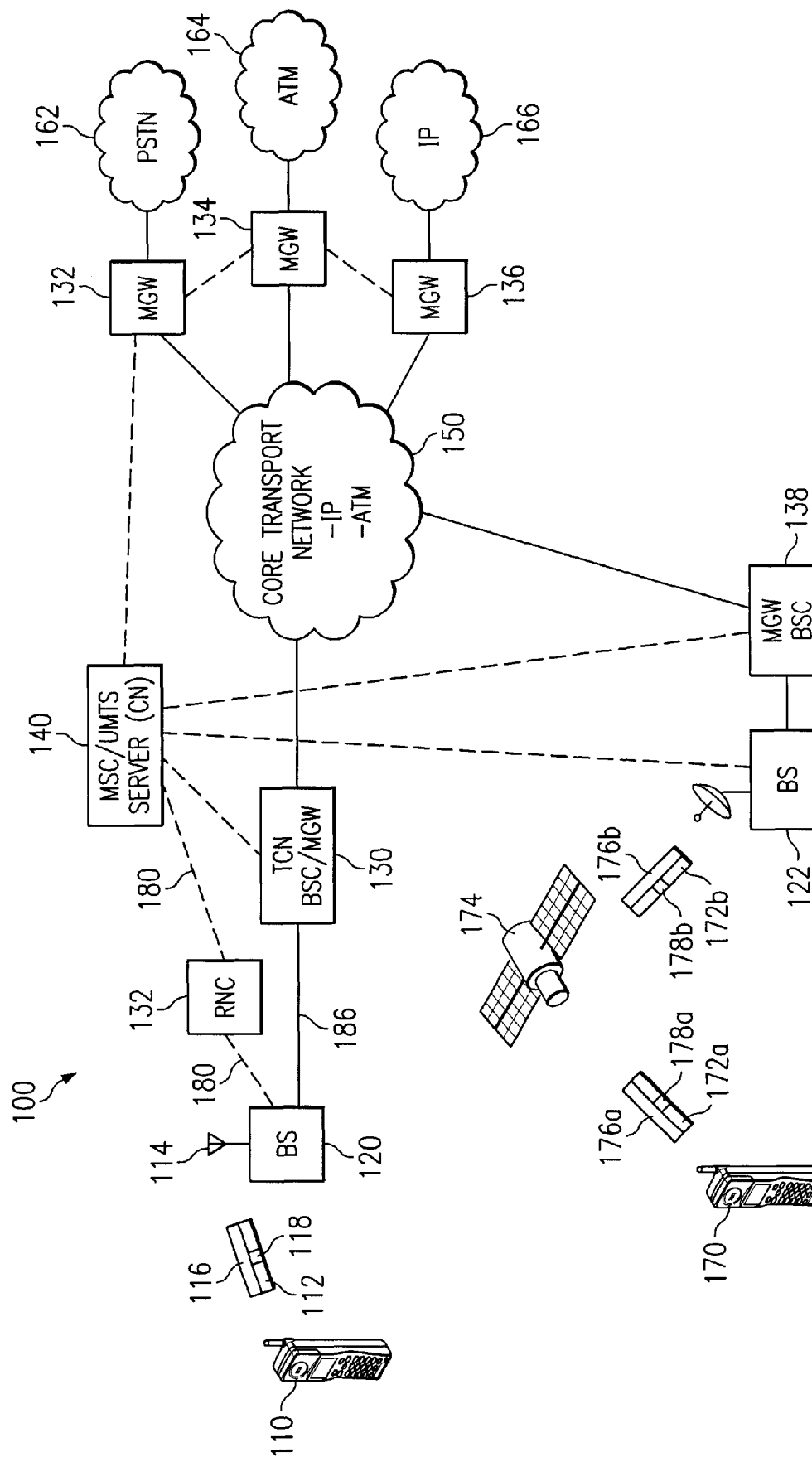
FIG. 1 (Prior Art) illustrates a generic 3G mobile communications network that incorporates both a mobile phone interface and a satellite-phone air interface.

The present invention is a system, method and computer program for transmitting, across a mobile communication network, the occurrence of silence in a communication channel. The system generally comprises a first transmission control node (first TCN) for executing a silence transmission algorithm, and a second transmission control node (second TCN) for executing a silent noise generating algorithm. One method detects silence in a communications channel and then transmits a network Silence Indicator (SID), while another method receives the network SID and then produces a silent noise. The computer program utilizes a query module for detecting a silent noise production module in a destination TCN, and a network SID transfer module to send a network SID across a PLMN. The invention, through these disclosed embodiments and other anticipated embodiments, reduce the processing burden placed on mobile communications systems by the transmission of silent noise.

System

FIG. 2 is a simplified diagram of one embodiment of the present invention implemented in a 3G-NA system 200. Although the following discussion specifically refers to a third generation GSM network in general, and a 3G-NA system specifically, the invention may also be applied to other networks that provide voice communications, such as GPRS, and IS-136, for example. Also, though much of the following discussion is directed at unidirectional voice transmissions (from an originating terminal device to a destination terminal device), it should be understood that the direction of voice transmission may also take place in the opposite direction from that discussed. In FIG. 2, a mobile phone 210 communicates across communications channel 212 by sending or receiving data units in time slots via an antenna 214 which is coupled to base station (BS) 220. Transmissions made from the originating terminal device and destined for a destination terminal are said to travel "upstream." Likewise, transmissions made in the opposite direction are said to travel "downstream." Although a mobile phone 210 is shown, any terminal device may be in communication with the antenna 214.

In GSM, a BS, along with a transmission control node (TCN) (which will be a Base Station Controller (BSC) in GSM) are known as a Base Station Subsystem (BSS) 220. Of course, in systems other than GSM, the functionality of the BSS 220 will be accomplished in other devices, such as a Media Gateway (MGW). To support control functions, the BS 220 is in communication with a control node (CN) 250, which will be a Mobile Switching Center (MSC) server in GSM, for example, and, as shown here, a UMTS server in 3G GSM. The BSS 220, UMTS server 240, and the media gateways of connected transport networks, such as the second MGW 232, comprise the control plane of the 3G-NA system 200. Likewise, pathways 280, 284, which provide the connections for control communications in the control plane, are shown in FIG. 2 as dotted lines.

In operation, voice travels between terminal devices in the 3G-NA system 200 across a user plane, which is generally comprised of devices/connections connected by solid lines in FIG. 2, such as the solid line 286. Accordingly, the transfer of voice in FIG. 2 occurs between the mobile phone 210 and another terminal device in communication within a transport network 260. For example, voice or other sounds are received by the antenna 214, and passed to the BSS 220. Then, voice data units are sorted in the BSS 220 and are then configured for transport across the core transport network 250 (such as an Asynchronous Transfer Mode (ATM) network, or an Internet Protocol (IP) network). After transport through the core transport network 250, the voice data units arrive at the media gateway 232, where they are reconfigured for transport across the transport network 260 for arrival at a destination terminal device.

Discontinuous transmission is a feature of GSM in which speech transmitted from a terminal device to the network only when there is actual speech available for transmission. Discontinuous transmission is implemented in GSM by using silence indicator frames. A silence indicator (SID) frame is a standardized frame sent by a terminal device on the air interface's upstream channel to indicate silence when that terminal device detects that the user is not speaking. This helps reduce co-channel interference in the air interface. Generally, the terminal device takes a sample of the background noise, and sends the sample in the SID to the BS of the BSS 220. Then, the BS stores and processes that sample to generate filler information for cell or packet payloads, and the filler information is then transmitted to the BSC, TCN or other MGW through links which typically operate at 64 kbps.

In general, the purpose of the SID is to reduce the number of transmissions required by the terminal device. Therefore, the SID frame is periodically transmitted (rather than speech frames) as long as the terminal device does not detect speech. In GSM, a SID frame containing a new silence sample is repeated every 480 ms. The BSS receiving the SID terminates the SID and creates filler "speech samples" to place in payloads of cells and packets that travel across that core transport network.

Accordingly, in one embodiment, the system of the present invention uses a network SID algorithm to send the SID frame as a network SID across the mobile communications network in an ATM cell, IP packet, or other type of data transmission payload. The destination MGW/IUW then performs the expansion of the network SID to constant bit rate speech to generate comfort noise.

To provide the present invention in the control plane, the BSS 220 and the MGW 232 each possess a network SID algorithm 272, 274. Generally, the network SID algorithm detects silence in the upstream communication channel of the air interface, and then produces a network SID. The network SID is then sent to a destination MGW 232 through the control plane (rather than the core transport network). Once the destination MGW receives the network SID, it generates comfort noise in a destination terminal device based on the network SID received.

Method and Computer Program

The present invention generally identifies silence (or, a level of sound existing below some threshold) in an uplink communication channel linking a terminal device to a MGW, which could be a TCN, and provides for the reproduction of equivalent silence, or comfort noise, in a destination terminal. More specifically, the present invention detects the occurrence of silence in an uplink communication channel, either directly or as a SID code, and then transmits a silence indicator, such as a Network SID. A receiving device, typically a destination TCN, will then process the silence indicator, and, depending on the type of silence indicator received, produce a predetermined comfort noise.

The functionality of the present invention is achieved in one embodiment as a Network Silence Indicator (Network SID) algorithm. FIG. 3 illustrates one embodiment of a network SID algorithm 300 according to the teachings of the present invention, practiced in the 3G-NA system 200. First, in a monitor channel step 305, the network SID algorithm 300 monitors the unlink channel between the source terminal 210 and the BSS 220. As long as sound is detected, the SID algorithm does nothing. However, eventually, silence will be detected. Thus, in a receive silence step 310, the BSS 200 receives from the uplink communication channel a frame or frames either containing sound below some threshold (indicating silence), or a SID frame (as is used in discontinuous transmission protocol), or some other indicator of silence on the uplink channel. The detection of silence on the uplink channel indicates that processing time and effort can be saved by sending a Network SID.

A network SID is somewhat analogous to a SID in the uplink communication channel. The network SID can be implemented as a cell in ATM, a packet in IP, or as a control command, for example. Generally, a network SID contains the information needed by the destination TCN for the destination TCN to produce comfort noise (discussed in greater detail below). The receive silence step 310 is accomplished in computer software as a silence detection module.

Next, in a query TCN step 320, the network SID algorithm 300 sends a control signal to the destination MGW 232, which could be a TCN, to see if the destination MGW 232 possesses a SID algorithm 274 that is compatible with the network SID algorithm 272 in the BSS 220. If the SID algorithm 274 is present in the destination MGW and is compatible with the SID algorithm 272, then the network SID algorithm 300 proceeds to a send SID step 340. Otherwise, the network SID algorithm 300 passes control to the BSS 330 and proceeds to encode silence as silence is processed and transmitted across a mobile network in the prior art, in an encode silence step 330.

In the send SID step 340, the network SID algorithm 300 builds a SID command, or a SID packet, or a SID cell, and sends it across the core transport network 250. The type of command, cell, or packet produced in the SID step 340 will be dependent on the type of core transport network 250 that carries the command, cell or packet, and will also depend on whether the command is to be sent across a user plane or a control plane (the choices of what core network or what plane to use will depend on the available core networks between the source and the destination, as well as a choice of the "best" method of delivery of comfort noise; the choice of the "best" method of delivery of the comfort noise may depend on a number of factors, such as system processing requirements, and guarantees of quality and performance made to the user, and can be set by a network operator/administrator, or implemented in automated decision making software).

Of course, if transport networks other than IP or ATM networks are used, the network SID algorithm accommodates these. For example, if a H.323 network supports network SID, then the MGW of the BSS and the destination MGW convert the SID information to the format specified by the H.323 standard. Other transport networks include the Plain Old Telephone System (POTS), a Public Land Mobile Network (PLMN), or a Public Switched Telephone Network (PSTN) for example. The same approach follows for the multiplexing of trunks.

For example, when sending a network SID across IP, the network SID will be a packet that comprises IP header information (source and destination addresses), a frame that will indicate the packet type as a network SID packet, and the packet payload will comprise a sample of the silence at the source terminal. When a network SID is sent across an ATM network, the network SID will be a cell that comprises, in addition to the header, an octet identifying the cell as a network SID, and a sample of the silence in the source terminal in the cell payload. Furthermore, when the network SID is sent to a destination MGW via the control plane as a control command, the control command need only comprise the source terminal address, the destination terminal address, and an identification of the command as a network SID command. When executed as a cell or packet, the network SID travels in the user plane between the BSS and the destination MGW.

Accordingly, as in discontinuous transmission SID, the network SID can carry a sampling of the silence at the originating terminal. The destination MGW will then use the sample of the silence to reproduce the silence for a predetermined period of time. Likewise, when executed as a control channel signal, the network SID travels in the user plane. When receiving a network SID from the control plane, the destination MGW will not have a sample of the silence from which to reproduce the comfort noise. Thus, the destination MGW could use either a generic, pre-recorded comfort noise for retransmission as comfort noise, or the destination MGW could use samples of the silence previously detected at the destination terminal, for example.

After sending a network SID in the send SID step 340, the network SID algorithm returns to the monitor channel step 305 and awaits the next detection of silence. The send SID step 340 can be accomplished in software, and is known in software as a "network SID transmission module." The generation of comfort noise is accomplished upon receipt of a network SID by a comfort noise algorithm.

Further understanding of the invention can be gained by examining the functionality of a comfort noise algorithm. FIG. 4 is a block flow diagram of a comfort noise algorithm 400. First, in a receive MGW query step 410, the comfort noise algorithm 400 receives from the network SID algorithm 300 a request for information about the type of network SIDs the comfort noise algorithm 400 is capable of processing in the destination MGW, which in 3G will be TCN. Then, in a send information step 420 the comfort noise algorithm 400 sends the requested information to the network SID algorithm 300. Assuming that the network SID algorithm 300 determines that the comfort noise algorithm 400 is a compatible comfort noise algorithm, then the comfort noise algorithm 400 proceeds to wait to receive a network SID from the network SID algorithm 300 in a wait step 430.

If the comfort noise algorithm 400 is not compatible with the network SID algorithm 300, then the comfort noise algorithm will automatically time-out in an end-wait query 440. Accordingly, in the end wait query 440, if a predetermined amount of time expires, the comfort noise algorithm 400 ends in an end step 445, and sits idle until a MGW query is received and a new receive MGW query 410 is initiated. Otherwise, if a network SID is received before the time expires in the end wait query 440, the end wait query timer terminates and the comfort noise algorithm 400 proceeds while ignoring the wait query timer (i.e., without ending the comfort noise algorithm 400.

Next, a network SID will be received in a receive network SID step 450. Upon receiving the network SID, the comfort noise algorithm will produce comfort noise depending on the type of network SID message received. Thus, the comfort noise algorithm 400 detects the network SID type in a network SID type query 460. Then, for example, if the network SID is a control command, then the comfort noise algorithm 400 will produce a predefined comfort noise in a generate comfort noise step 470. The predefined comfort noise could be pre-recorded noise stored in a memory and reproduced for each comfort noise transmission.

Alternatively, the predefined comfort noise could be a recorded sample of the silence occurring on the destination terminal uplink. Likewise, in a retransmit comfort noise step 480, if the network SID type is a cell or a packet that arrives across the user plane, the comfort noise algorithm 400 proceeds to strip the cell or the packet of the header information and then process the noise sample to reproduce the silence at the originating terminal as comfort noise.

Following the generate comfort noise step 470, and the retransmit comfort noise step 480, the comfort noise algorithm returns to monitoring the core transport network for additional network SIDs in the wait step 430.

Specific cases of using the network SID provide additional insight to the present invention. In one case, the base station of the BSS will receive a SID frame from the originating terminal device on the uplink channel. The base station then forwards the SID directly to the media gateway as the network SID, as described above. The MGW then uses comfort noise level information in the SID to generate comfort noise in the destination terminal device. The SID can be forwarded as a payload in a packet or a cell, or as a control command. Note that this case, in GSM, will produce a network SID for every 480 ms of continuous silence (since SID frames are generated in GSM on the uplink channel by the originating terminal device every 480 ms of continuous silence). This information can be used to adjust queue length, or used to generate volume-based charging.

In a second case, the network SID is sent only when the silence on the uplink channel from the originating terminal device exceeds a predefined threshold. This case can be viewed as a threshold detection method. Accordingly, the SID of the channel is terminated in the BSS, which checks to see if the threshold is exceeded. When the threshold detection method is used, the MGW of the destination terminal may need to run a timer to maintain continuity with the SID transmissions arriving at the originating BSS.

In a third case, the event of a mobile phone to mobile phone connection going via an "anchor" (meaning common) MGW is considered. Here, the MGW looks at the SID information and, instead of inserting comfort noise, the MGW sends the SID directly to the other BSS. The destination BSS then inserts comfort noise in the downlink to the destination mobile phone. If the BSS is configured to support discontinuous transmission on the downlink channel, the destination BSS can forward the SID directly to the destination mobile station and the destination mobile station can generate its own comfort noise.

Specific Network Configurations

The link between a BS and a TCN is typically a proprietary link referred to as an "Abis" link. If the Abis link is based on Synchronous Transfer Mode (STM), then the BS may process the comfort noise, but the BS also sends the SID across the Abis link to the BSC or other TCN in the BSS. The BSC then serves to effectively terminate the traffic channel, and sends the SID information to the destination MGW as noted earlier.

The link between the BSS and the MSC or the core transfer network is sometimes called the "A interface." If the Abis and A-interface are STM based, then the SID information noted above is forwarded to a MGW on the boundary between the core transfer network and the A-interface. The comfort noise frames may or may not be forwarded to the BSC or the MGW. Likewise, for UNITS, the silence information may be terminated at the Radio Network Controller (RNC), or may be forwarded to the MGW at the boundary of the UTRAN and the core network in the same way as described for the GSM-case.

In the case of satellite networks, SID handling can be performed by the satellite. In other words, the satellite can receive the network SID and forward them to a ground based station as a network SID or a control signal, thus saving capacity on the feeder links as well as in the terrestrial transmission network. The satellite could also generate the comfort noise directly. For mobile-to-mobile calls, in addition to the permutations listed before, the SID information can be sent by the satellite to the terminal, which saves capacity on the uplink and on the downlink. Alternatively, the satellite can generate comfort noise itself, thereby saving capacity on the uplink.

To implement the present in a mobile communications network, the network SID functionality could be added to a subscriber profile (SCP). For example, the use or non-use of network SID discontinuous transmission (DTX) can be established as a subscription parameter per subscriber, with the ability to be invoked or excluded per call via a subscriber profile. The DTX parameter value is stored in the home location register (HLR) or SCP, downloaded to a visitor location register (VLR), then negotiated with the mobile phone as part of a call set-up.

While the invention has been described in conjunction with preferred embodiments, it should be understood that modifications will become apparent to those of ordinary skill in the art and that such modifications are therein to be included within the scope of the invention and the following claims.

We claim:

1. A method of providing comfort noise to a destination mobile terminal in a mobile communication network during a period of silence on a mobile communication channel, comprising the steps of:

generating by an originating mobile terminal, a silence indicator (SID) upon detecting the period of silence on the mobile communication channel;

detecting by a Base Station System (BSS), the SID generated by the originating mobile terminal;

responsive to detecting the SID, generating by the BSS, a network SID;

periodically transmitting the network SID from the BSS to a destination Media Gateway (MGW);

responsive to receiving the network SID, generating by the destination MGW, a comfort noise signal; and transmitting by the destination MGW, the generated comfort noise signal to the destination terminal through a user plane.

2. The method of claim 1 wherein the step of periodically transmitting the network SID from the BSS to the destination MGW includes transmitting the network SID from the BSS to a Universal Mobile Telecommunications Systems Mobile Switching Center Server through a control plane.

3. The method of claim 2 wherein the step of generating a comfort noise signal includes generating by the destination MGW, a comfort noise signal that reproduces pre-recorded comfort noise.

4. The method of claim 1 wherein the step of periodically transmitting the network SID from the BSS to the destination MGW includes transmitting the network SID to the destination MGW through the user plane.

5. The method of claim 6 wherein the step of generating a comfort noise signal includes generating by the destination MGW, a comfort noise signal that reproduces a sample of silence from the mobile communication channel, said sample being carried by the network SID.

6. The method of claim 1 wherein the step of transmitting the generated comfort noise signal to the destination terminal includes transmitting by the destination MGW, the comfort noise signal for a predetermined period of time after receiving the network SID.

7. The method of claim 1 wherein the step of periodically transmitting the network SID from the BSS to the destination MGW includes transmitting the network SID as an Asynchronous Transfer Mode (ATM) cell.

8. The method of claim 1 wherein the step of periodically transmitting the network SID from the BSS to the destination MGW includes transmitting the network SID as an Internet Protocol (IP) packet.

9. A system in a mobile communication network for providing comfort noise to a destination mobile terminal during a period of silence on a mobile communication channel, comprising:
- an originating mobile terminal that generates a silence indicator (SID) upon detecting the period of silence on the mobile communication channel;
- a Base Station System (BSS) in communication with the originating mobile terminal, said BSS comprising:
  - means for detecting the SID generated by the originating mobile terminal;
  - means responsive to detecting the SID, for generating a network SID; and
  - means for periodically transmitting the network SID from the BSS to a destination Media Gateway (MGW); and
- a destination MGW that receives the network SID, said destination MGW comprising:
  - means responsive to receiving the network SID, for generating a comfort noise signal; and
  - means for transmitting the generated comfort noise signal to the destination terminal through a user plane.

\* \* \* \* \*